(12) United States Patent
Chen

(10) Patent No.: US 7,225,667 B2
(45) Date of Patent: Jun. 5, 2007

(54) TIRE PRESSURE GAUGE

(76) Inventor: Kuo-Liang Chen, No. 246-1, Changma Rd., Changhua (TW)

( * ) Notice: Subject to any disclaimer, the term of this patent is extended or adjusted under 35 U.S.C. 154(b) by 0 days.

(21) Appl. No.: 11/235,121

(22) Filed: Sep. 27, 2005

(65) Prior Publication Data

US 2007/0068239 A1 Mar. 29, 2007

(51) Int. Cl.
*G01M 17/02* (2006.01)
(52) U.S. Cl. .......................... 73/146; 340/442
(58) Field of Classification Search .................. 73/146, 73/146.2, 146.3, 146.5, 146.8; 340/442
See application file for complete search history.

(56) References Cited

U.S. PATENT DOCUMENTS 5,889,464 A * 3/1999 Huang .......................... 340/442

6,175,302 B1 * 1/2001 Huang .......................... 340/442

* cited by examiner

*Primary Examiner*—Andre J. Allen
(74) *Attorney, Agent, or Firm*—Hershkovitz & Associates; Abe Hershkovitz

(57) ABSTRACT

The tire pressure gauge has a body, a controller and a cap. The body has a valve stem connector that attaches to a valve stem of a tire to sample internal air pressure of the tire. The controller is mounted inside the body and includes a microprocessor, a pressure sensor, an alarm unit and a pressure indicator. The microprocessor stores a preset pressure value. The pressure sensor senses the tire's internal air pressure sampled by the valve stem connector, generates an electronic signal indicating the sensed pressure and sends the electronic signal to the microprocessor. The microprocessor compares the electronic signal to the preset pressure value. If the electronic signal is lower than the preset pressure value, the microprocessor activates the alarm unit that produces an audible warning.

6 Claims, 7 Drawing Sheets

TIRE PRESSURE GAUGE

BACKGROUND OF THE INVENTION

1. Field of the Invention

The present invention relates to a tire pressure gauge, and more particularly to a tire pressure gauge that produces an audible indication when a tire is under inflated.

2. Description of Related Art

Regularly checking a vehicle's tire pressure is a very important safety check that is often ignored by drivers.

With reference to FIG. 5, a conventional tire pressure gauge (40) has a body (42), a head (not numbered) and a pressure indicator (46). The body (42) is pencil-shaped and has a front end (not numbered) and a rear end (not numbered). The head is connected to the front end of the body (42) and has a valve stem connector (44). The valve stem connector (44) is connected to a valve stem on a tire to sample air pressure in the tire. The pressure indicator (46) is mounted slidably in the body (42), protrudes from the rear end of the body (42), is graduated in units of air pressure (not shown) and extends from the rear end of the body (42) to indicate the air pressure of a tire when the valve stem connector (44) is pressed onto a valve stem on a tire.

However, the conventional tire pressure gauge (40) can be difficult to read particularly in locations that are not well lighted or are pitch-black. Since the conventional tire pressure gauge (40) is a mechanical, analog device, tire pressure readings are not always accurate, especially when the tire pressure gauge (40) is old or has been abused.

To overcome the shortcomings, the present invention provides a tire pressure gauge to obviate or mitigate the aforementioned problems.

SUMMARY OF THE INVENTION

The main objective of the invention is to provide a tire pressure gauge that provides an audible warning when air pressure in a tire is low.

To accomplish the foregoing objective, the tire pressure gauge in accordance with the present invention comprises a body and a controller.

The body has a valve stem connector that attaches to a valve stem of a tire to sample internal air pressure of the tire.

The controller is mounted inside the body and comprises a pressure sensor, a microprocessor and an alarm unit. The pressure sensor senses the internal air pressure sampled by the valve stem connector, generates an electronic signal indicating the sensed pressure and sends the electronic signal to the microprocessor. The microprocessor compares the electronic signal to a preset pressure value. If the electronic signal is lower than the preset pressure value, the microprocessor activates the alarm unit that produces an audible warning.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
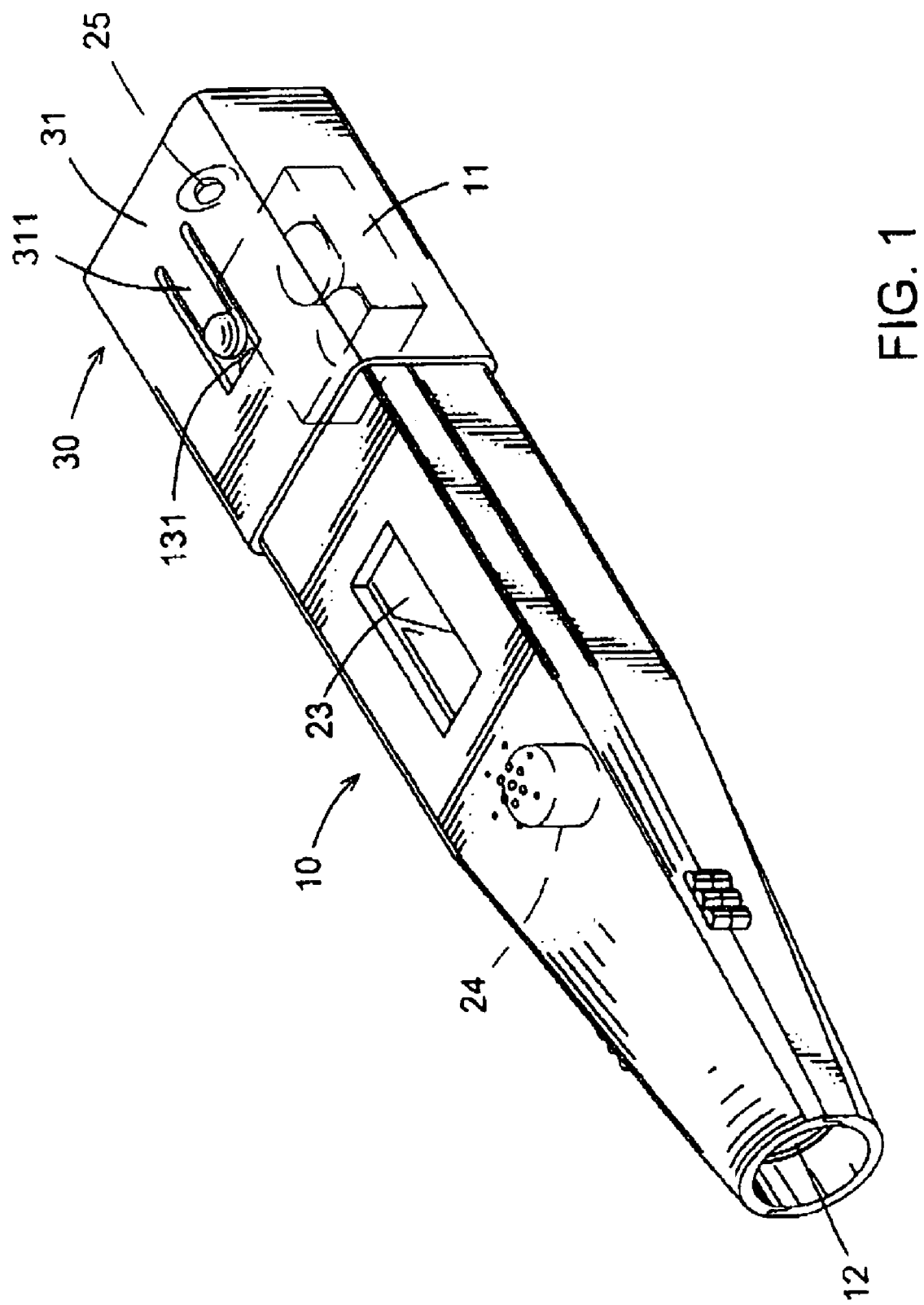
FIG. 1 is a perspective view of a tire pressure gauge in accordance with the present invention.
Figure 2:
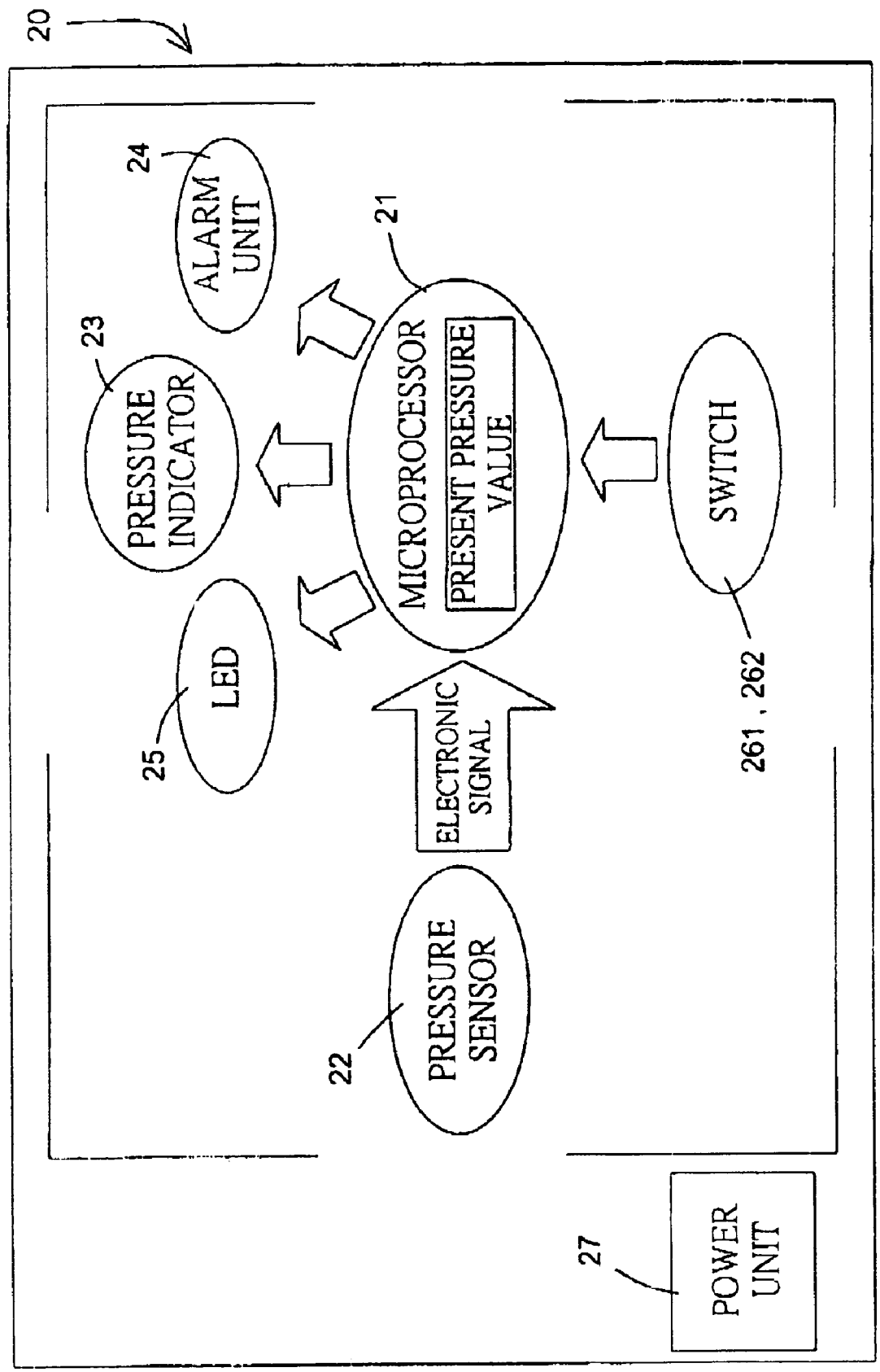
FIG. 2 is a functional block diagram of the tire pressure gauge in FIG. 1.
Figure 4:
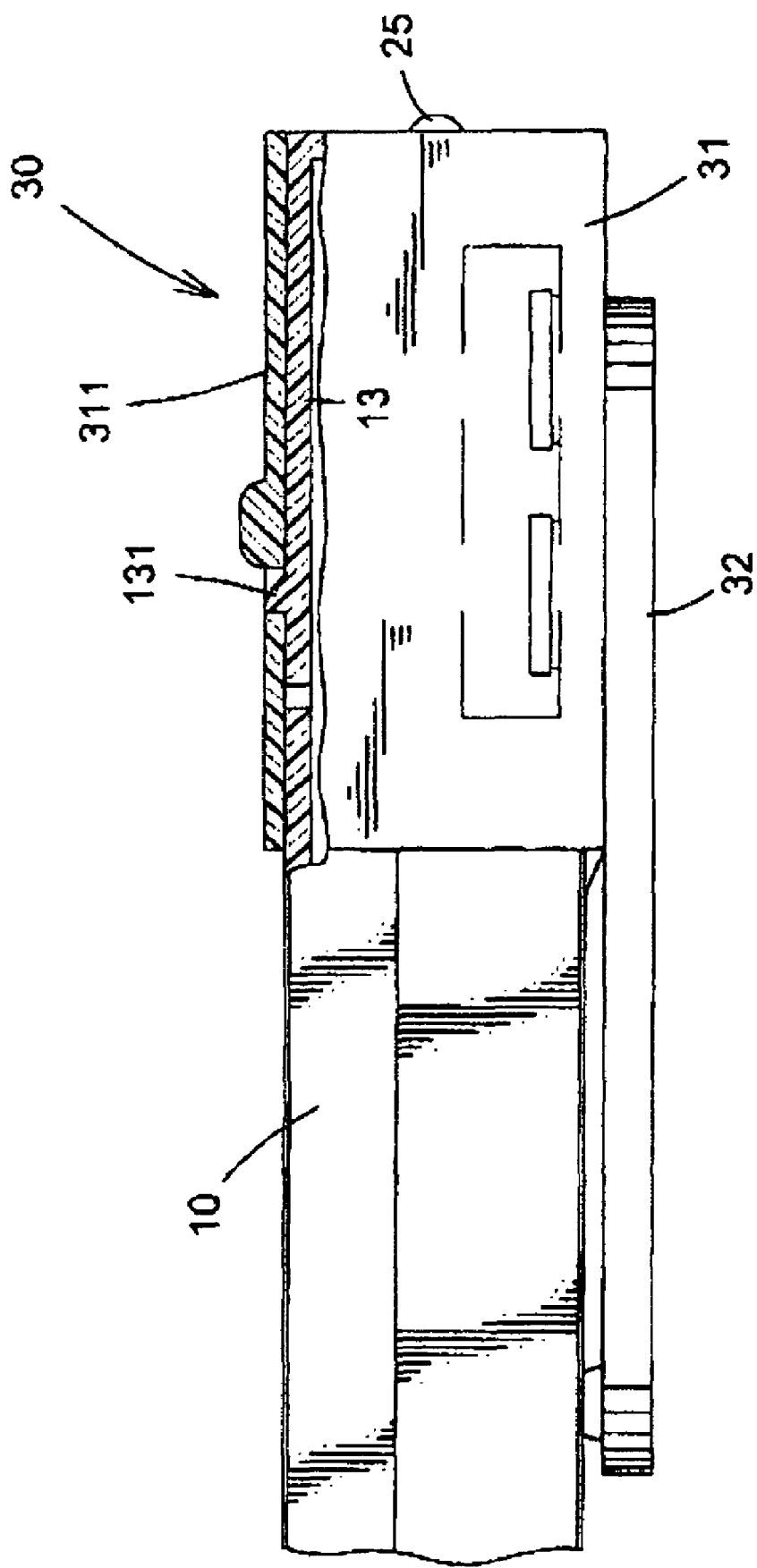
FIG. 4 is an enlarged side view in partial section of a cap mounted on the body of the tire pressure gauge in FIG. 1.
Figure 5:
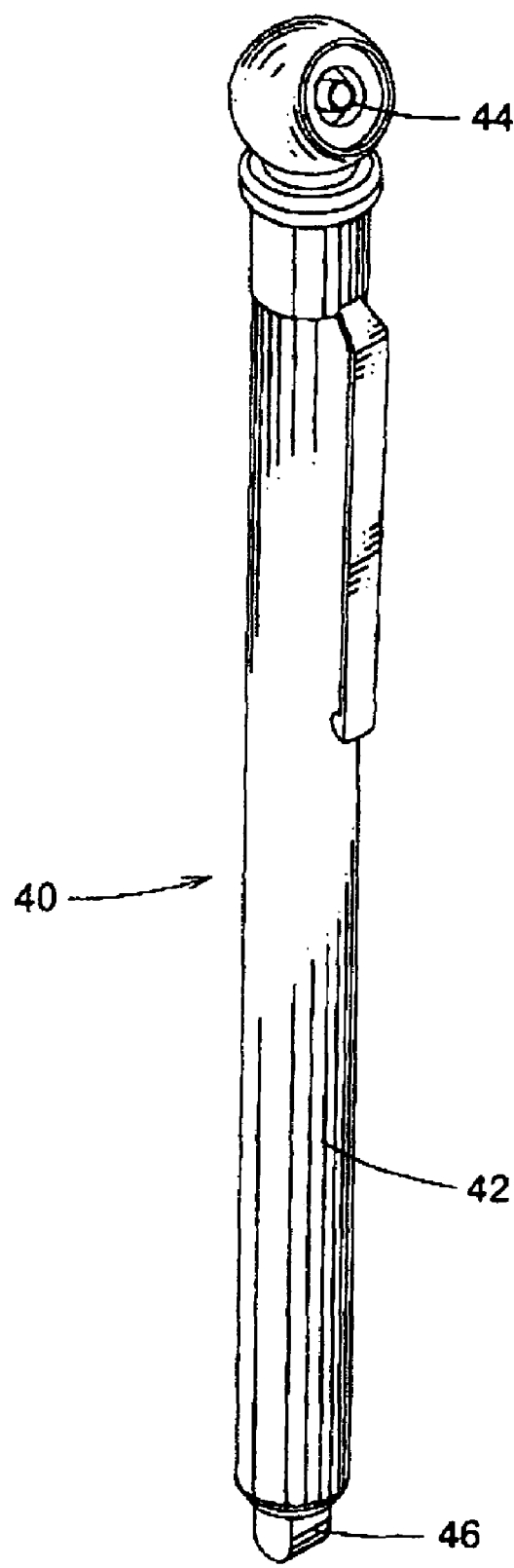
FIG. 5 is a perspective view of a conventional tire gauge in accordance with the prior art.

With reference to FIGS. 1, 2 and 4, a tire pressure gauge in accordance with the present invention comprises a body (10), a controller (20) and a cap (30).

The body (10) has a front end, a rear end, a sidewall, a battery compartment (11), a valve stem connector (12) and an optional resilient latch (13).

The front end has an opening, and the rear end has an opening.

The battery compartment (11) is formed at the rear end, communicates with the opening in the rear end and holds at least one battery.

The valve stem connector (12) is mounted in the opening at the front end of the body (10) and is pressed onto a valve stem of a tire to sample internal air pressure of the tire.

The resilient latch (13) is formed longitudinally in the sidewall of the body (10) and has a proximal end, a distal end and a lip (131).

The lip (131) is formed at and protrudes out from the distal end of the resilient latch (13).

Figure 3A:
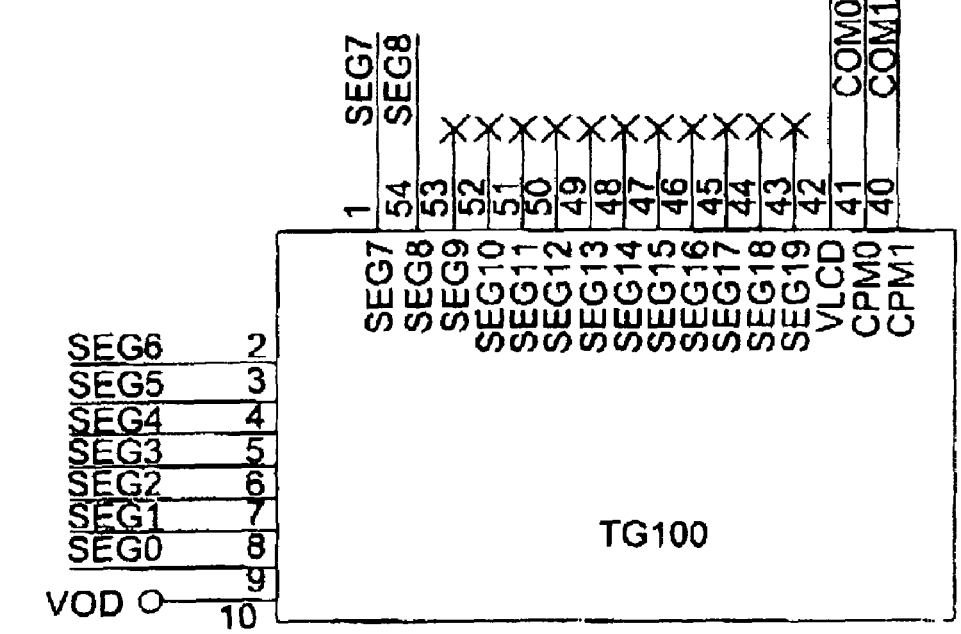
FIGS. 3A-3C are circuit diagrams of a controller for the tire pressure gauge in FIG. 1.
Figure 3B:
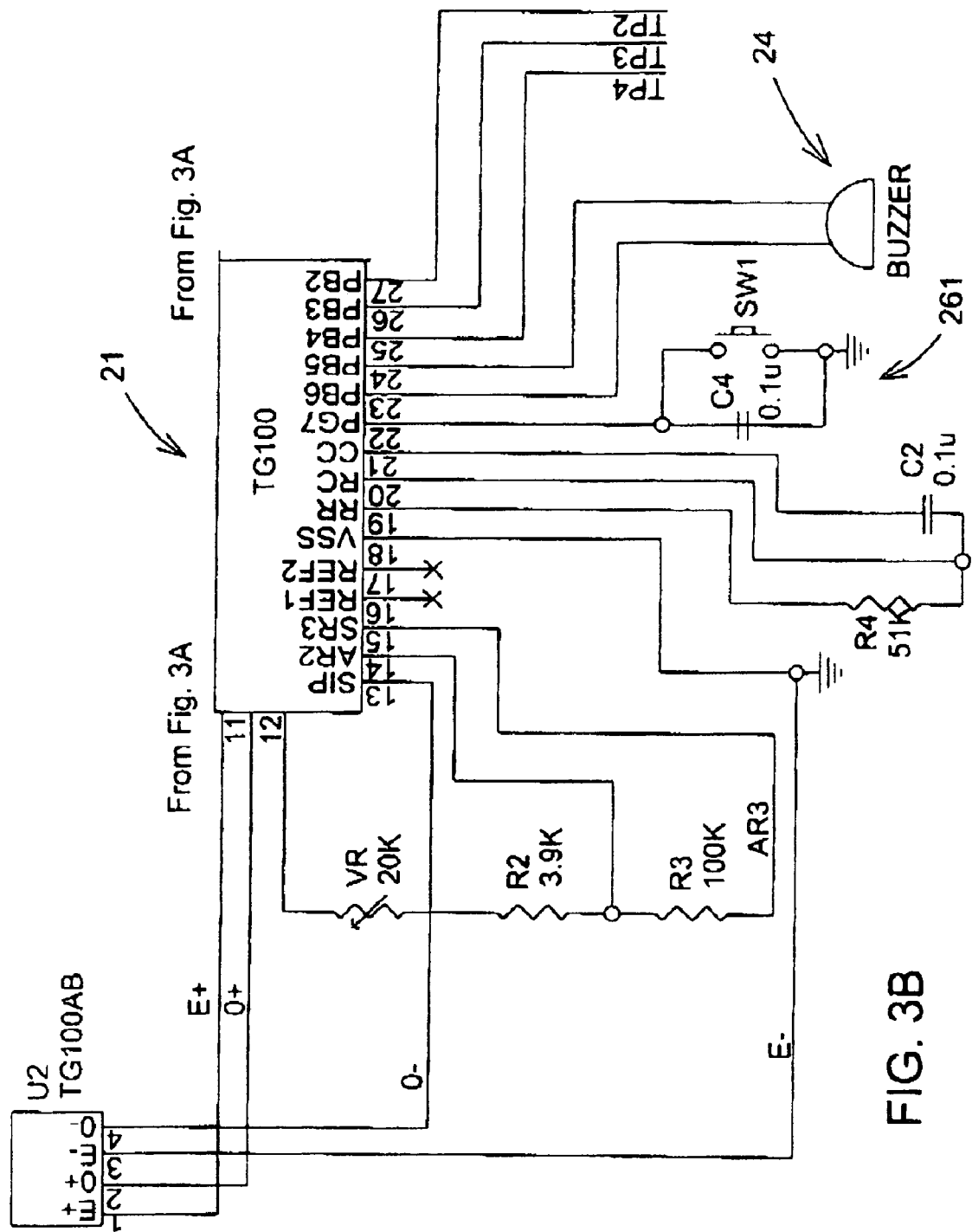
Figure 3C:
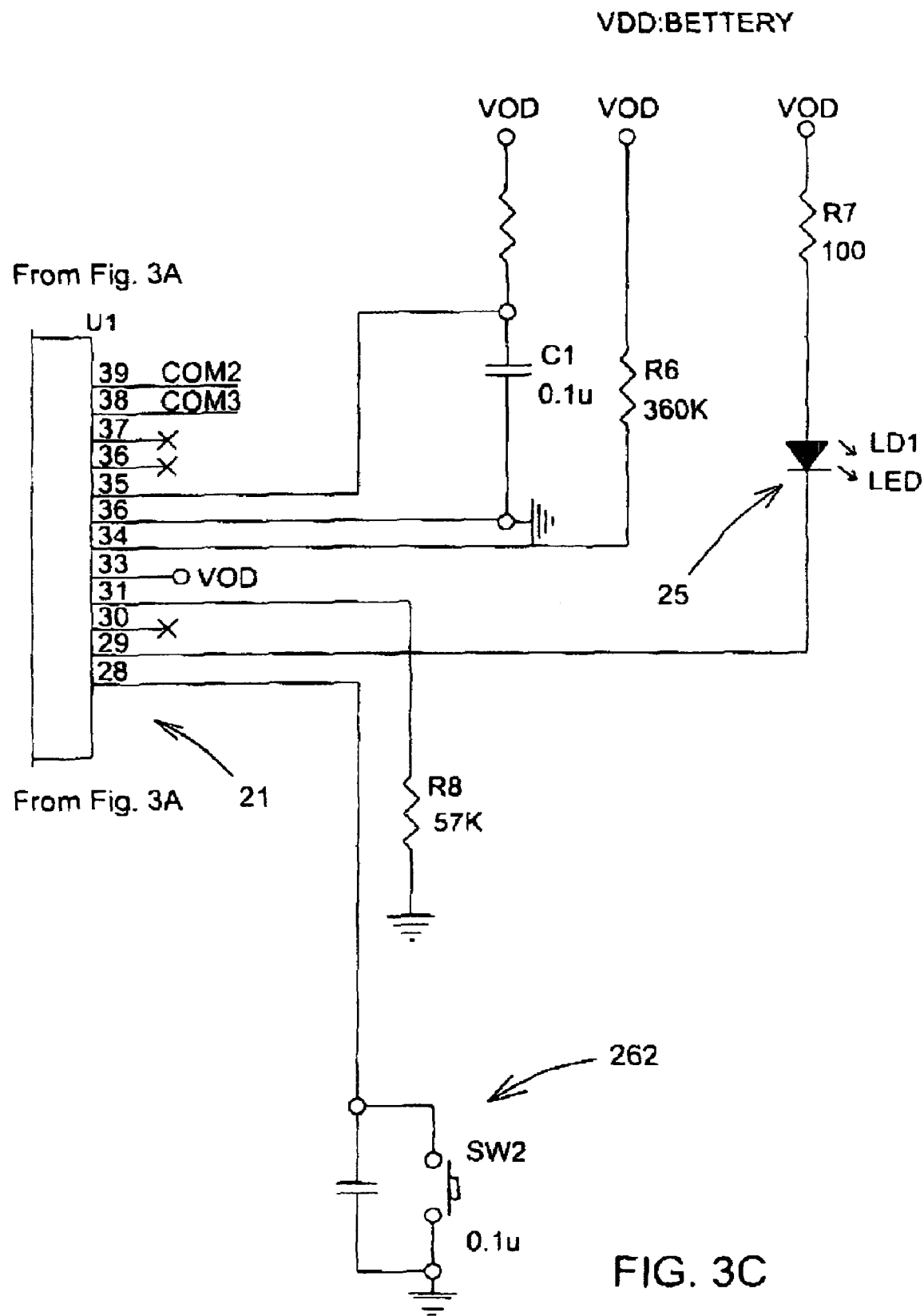

With further reference to FIGS. 3A-3C, the controller (20) is mounted inside the body (10) and comprises a microprocessor (21), a pressure sensor (22), a pressure indicator (23), an alarm unit (24), at least one optional LED (25), a mode switch (261), an optional light switch (262) and a power unit (27).

The microprocessor (21) has multiple input ports, multiple output ports and a preset pressure value. The preset pressure value is stored in the microprocessor (21).

The pressure sensor (22) is connected to the valve stem connector (12) and one of the input ports of the microprocessor (21), senses air pressure inside a tire sampled by the valve stem connector (12), generates an electronic signal indicating the sensed pressure and outputs the electronic signal to the microprocessor (21) for comparison to the preset pressure value.

The pressure indicator (23) is mounted on the body (10), is connected to one of the output ports of the microprocessor (21), is driven by the microprocessor (21), indicates a tire's air pressure and may be a display such as an LCD (liquid crystal display) or an LED (light emitting diode) display or multiple LEDs.

The alarm unit (24) may be a buzzer, is connected to one of the output ports of the microprocessor (21), is driven by the microprocessor (21) and emits an audible warning when the air pressure in a tire sensed by the pressure sensor (22) is below the preset pressure value in the microprocessor (21).

The LED (25) provides illumination and is connected to one of the output ports of the microprocessor (21).

The mode switch (261) is mounted on and protrudes through the body (10), is connected to one of the input ports of the microprocessor (21) and turns the tire pressure gauge on and off and change the units of pressure displayed in the pressure indicator (23).

The light switch (262) is connected to one of the input ports of the microprocessor (21) to turn the LED (25) on and off.

The power unit (27) is the at least one battery, is mounted in the battery compartment (111) and is connected to and supplies power to the microprocessor (21), the pressure sensor (22), the pressure indicator (23), the alarm unit (24) and the at least one LED (25).

The cap (30) is mounted detachably on the rear end of the body (10), closes the battery compartment (11) and comprises a sidewall, a hollow housing (31) and an optional pocket clip (32).

The hollow housing (31) has a closed outer end, a sidewall, an optional through hole and an optional resilient tab (311).

The closed outer end holds the at least one LED (25), covers the opening in the rear end of the body (10) and holds the at least one battery in the battery compartment (11).

The through hole is formed longitudinally in the sidewall of the hollow housing (31), corresponds to the resilient latch (13) and engages the lip (131) when the cap (30) is pressed onto the body (10) to hold the cap (30) securely on the body (10).

The resilient tab (311) is formed in the sidewall of the cap (30), aligns with the resilient latch (13) and releases the cap (30) from the lip (131) on the resilient latch (13) when the resilient tab (311) is pressed in so the cap (30) can be removed from the body (10).

The pocket clip (32) is attached to the sidewall of the hollow housing (31) to allow the tire pressure gauge to be carried in a person's pocket.

In operation, a driver presses the valve stem connector (12) onto a valve stem on a tire to check the internal air pressure of the tire, and realizes the status of the internal air pressure in a tire by an audible warning once the air pressure sensed by the pressure sensor (22) is below the preset pressure value in the microprocessor (21) or a value shown in the display and then acts to inflate the tire. Therefore, the tire pressure gauge in accordance with the present invention can be used in a location where is not well lighted or is pitch-black and is versatile in used.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A tire pressure gauge comprising:
    a body having
        a front end having an opening;
        a rear end having an opening;
        a sidewall;
        a battery compartment formed at the rear end and communicating with the opening in the rear end; and
        a valve stem connector mounted in the opening at the front end of the body and adapted to be pressed onto a valve stem of a tire to sample internal air pressure;
    a controller mounted inside the body and comprising
        a microprocessor having multiple input ports, multiple output ports and a preset pressure value stored in the microprocessor;
        a pressure sensor connected to the valve stem connector and one of the input ports of the microprocessor to sense air pressure inside a tire sampled by the valve stem connector, to generate an electronic signal indicating the sensed pressure and to output the electronic signal to the microprocessor for comparison to the preset pressure value;
        a pressure indicator mounted on the body, connected to one of the output ports of the microprocessor and driven by the microprocessor to indicate a tire's air pressure;
        an alarm unit connected to one of the output ports of the microprocessor and driven by the microprocessor to emit an audible warning when the air pressure in a tire sensed by the pressure sensor is below the preset pressure value in the microprocessor;
        a mode switch mounted on and protrudes through the body, connected to one of the input ports of the microprocessor and turning the tire pressure gauge on and off and changing the units of pressure displayed in the pressure indicator; and
        a power unit being at least one battery, mounted in the battery compartment and being connected to and supplying power to the microprocessor, the pressure sensor, the pressure indicator and the alarm unit; and
    a cap mounted detachably on the rear end of the body, closing the battery compartment and comprising
        a hollow housing having
            a closed outer end covering the opening in the rear end of the body and holding at least one battery in the battery compartment; and
            a sidewall;
        a pocket clip attached to the sidewall of the hollow housing; and
        a sidewall.

2. The tire pressure gauge as claimed in claim 1, wherein the alarm unit is a buzzer.

3. The tire pressure gauge as claimed in claim 1, wherein the pressure indicator is a display.

4. The tire pressure gauge as claimed in claim 3, wherein the display is an LCD (liquid crystal display).

5. The tire pressure gauge as claimed in claim 3, wherein the controller further comprises
    at least one LED providing illumination and connected to one of the output ports of the microprocessor; and
    a light switch connected to one of the output ports of the microprocessor to turn the LED on and off.

6. The tire pressure gauge as claimed in claim 1 wherein the body further comprises a resilient latch formed longitudinally in the sidewall of the body and having
    a proximal end;
    a distal end; and
    a lip formed at and protruding out from the distal end of the resilient latch; and
    the hollow housing of the cap further has
        a through hole formed longitudinally in the sidewall of the hollow housing, corresponding to the resilient latch and engaging the lip when the cap is pressed onto the body to hold the cap securely on the body; and
        a resilient tab formed in the sidewall of the cap, aligning with the resilient latch and releasing the cap from the lip on the resilient latch when the resilient tab is pressed in so the cap can be removed from the body.

* * * * *